3,398,031
CORROSION INHIBITORS FOR AQUEOUS PERCHLORIC ACID

Clyde J. Poulin, Phoenix, Ariz., and George Rice, Montclair, N.J., assignors, by mesne assignments, to the United States of America as represented by the Secretary of the Navy
No Drawing. Filed July 21, 1967, Ser. No. 655,247
10 Claims. (Cl. 149—109)

ABSTRACT OF THE DISCLOSURE

A method for inhibiting the metal corrosive properties of an aqueous perchloric acid solution comprising admixing with the acid solution, an inhibiting reagent such as chloral hydrate, trichloroacetic acid or hydrogen fluoride. A non-corrosive aqueous perchloric acid solution prepared by the foregoing method.

Background of the invention

This invention relates to a method for inhibiting the metal corrosive properties of an acid solution and more particularly to a means for inhibiting the metal corrosive properties of an aqueous perchloric acid solution.

Although aqueous perchloric acid has found principal utility as a versatile analytical reagent, more recently, the acid has found widespread acceptance in propellant formulations both as a precursor for the preparation of propellant compositions and as a neat oxidant for either monopropellant or multipropellant compositions. Difficulties have been encountered however in the handling of this important acid due to its relatively high reactivity and high corrosiveness toward most structural metals including iron, steel, aluminum, aluminum alloy, chromium, nickel, tin, lead, copper and even the noble metals such as silver, platinum and gold. In order to facilitate handling, a need existed in both chemical and aerospace industries for a means of inhibiting corrosive action of perchloric acid solutions toward a variety of inexpensive structural metals, which means would not substantially interfere with the acid's desirable chemical and physical properties.

Summary of the invention

It is therefore an object of this invention to provide a means for inhibiting the corrosive properties of aqueous perchloric acid solutions. It is further an object of this invention to provide an aqueous perchloric acid solution which is relatively inert and non-corrosive toward a variety of inexpensive structural metals and alloys. It is another object of this invention, to provide a method for inhibiting the metal corrosive properties of aqueous perchloric acid solutions by the use of inexpensive and readily available reagents which will substantially reduce the corrosive properties of the solution yet which will not substantially alter its desirable chemical and physical properties.

These and other objects are attained herein by providing an admixture of an inhibiting quantity of a reagent selected from the group comprising chloral hydrate, trichloroacetic acid and hydrogen fluoride, with an aqueous solution of perchloric acid.

Description of the preferred embodiments

Non-corrosive aqueous perchloric acid solutions are prepared according to this invention by adding to a perchloric acid solution, an inhibiting quantity of a reagent selected from the group of chloral hydrate, trichloroacetic acid and hydrogen fluoride. The exact amount of reagent is not critical and is dependent only on the particular reagent selected and particular acid concentration and may quickly be determined by one of ordinary skill in the art. However, in general, it has been found that at least 0.05 part of reagent per 100 parts of acid solution is desirable for adequate results. The maximum quantity of reagent is also not critical and is limited only by the effects of the reagent on the desirable chemical and physical properties of the perchloric acid. In minor concentrations, the reagents of this invention have only an insignificant effect on the properties of the acid, other than its corrosiveness and hence, it is desirable to use a minimum quantity of the inhibiting reagent.

The reagents are effective for inhibiting metal corrosion in any aqueous perchloric acid solution and especially those having an acid concentration of between 0.1% to 72.5%. Above 72.5% the acid forms a constant boiling mixture, is difficult to prepare and its properties are substantially dissimilar to those solutions having less than 72.5% acid concentration.

Having generally described the invention, the following examples are provided for purpose of illustration only and are not meant to be limiting in any manner.

CORROSION INHIBITION WITH COPPER/70-72 PERCENT $HClO_4$ SYSTEM AT 25° C.

| Example | Inhibitor Reagent | Percent Conc. of Reagent 70 percent HClO | Results |
|---|---|---|---|
| 1 | None | | The acid solution turned blue in 15 min. |
| 2 | Chloral hydrate | 0.10 | The solution turned blue after 56 hours. |
| 3 | do | 0.55 | Do. |
| 4 | Trichloroacetic acid | 0.10 | The solution turned blue after 40 hours. |
| 5 | do | 0.55 | Do. |
| 6 | HF | 0.75 | The solution turned blue after 144 hours. |

In the foregoing examples, pure copper metal was used as the test specimen since its acid corrosion may quickly be evidenced by the formation of a light blue coloration in the acid solution. Although copper was the metal selected, other structural metals such as steel, tin, etc. will provide substantially similar results.

Example 1 is a control test wherein no inhibiting reagent was added to the solution. The visable blue color, indicative of copper corrosion, was noted in the non-inhibited control solution within fifteen minutes after contact with the metal. In comparison, when inhibiting quantities of each of chloral hydrate, trichloroacetic acid or hydrogen fluoride were added to the solution, the indicative blue coloration did not appear until 56, 40 and 144 hours respectively. While the precise mechanism for the corrosive inhibiting effects of these reagents are not fully understood, it is believed that they interfere chemically with the corrosion mechanisms of the acid.

As will be evident to those skilled in the art, various modifications of this invention can be made and followed in the light of this disclosure without departing from the spirit or scope of the invention.

What is claimed as new and desired to be secured by Letters Patent is:

1. A method for inhibiting the metal corrosive properties of perchloric acid which comprises admixing with an aqueous solution of perchloric acid, a corrosion inhibiting quantity of a reagent selected from the group consisting of chloral hydrate, trichloroacetic acid and hydrogen fluoride.

2. The method of claim 1 wherein at least 0.05 part of said reagent is admixed with 100 parts of said aqueous perchloric acid solution.

3. The method of claim 1 wherein the concentration of said aqueous perchloric acid solution is in the range of from about 0.1% to about 72.5%.

4. The method of claim 1 wherein said reagent is hydrogen fluoride.

5. The method of claim 1 wherein said reagent is chloral hydrate.

6. A relatively non-corrosive aqueous perchloric acid solution which comprises the mixture of an inhibiting quantity of a reagent selected from the group consisting of chloral hydrate, trichloroacetic acid and hydrogen fluoride, with an aqueous perchloric acid solution having an acid concentration of from about 0.1% to about 72.5%.

7. The relatively non-corrosive solution of claim 6 wherein at least about 0.05 part of said reagent is admixed with about 100 parts of said aqueous perchloric acid solution.

8. The relatively non-corrosive solution of claim 6 wherein said reagent is chloral hydrate.

9. The relatively non-corrosive solution of claim 6 wherein said reagent is trichloroacetic acid.

10. The relatively non-corrosive solution of claim 6 wherein said reagent is hydrogen fluoride.

References Cited

UNITED STATES PATENTS

| | | | |
|---|---|---|---|
| 2,504,119 | 4/1950 | Frazer et al. | 149—75 X |
| 2,968,539 | 1/1961 | Wharton | 149—75 |
| 3,272,755 | 9/1966 | Shiraeff | 149—75 X |

OTHER REFERENCES

Emeleus et al.: Advances in Inorganic Chemistry, vol. 8, Academic Press, New York, 1966, pp. 177, 199, 200 and 218 to 224.

CARL D. QUARFORTH, *Primary Examiner.*

L. A. SEBASTIAN, *Assistant Examiner.*